United States Patent [19]

Takata et al.

[11] 4,068,472

[45] Jan. 17, 1978

[54] FIRST AND SECOND AIR FEEDING MEANS TO REGULATE A/F RATIO WHEREIN SECOND AIR FEED REQUIRES TWO SIGNALS FOR ACTUATION

[75] Inventors: Akira Takata; Toshio Tanahashi; Toshio Oda, all of Toyota, Japan

[73] Assignee: Toyota Jidosha Kogyo Kabushiki Kaisha, Toyota, Japan

[21] Appl. No.: 718,535

[22] Filed: Aug. 30, 1976

[30] Foreign Application Priority Data

May 18, 1976 Japan .................................. 51-56024

[51] Int. Cl.² ........................ F02B 75/10; F01N 3/15; F02M 23/00
[52] U.S. Cl. ...................................... 60/276; 60/290; 123/124 B; 192/.084
[58] Field of Search ........................ 60/276, 289, 290; 192/.084; 123/124 B

[56] References Cited

U.S. PATENT DOCUMENTS

| 3,236,344 | 2/1966 | Wawrzinick et al. | 192/.084 |
|---|---|---|---|
| 3,696,618 | 10/1972 | Boyd et al. | 60/276 |
| 3,962,867 | 6/1976 | Ikeura et al. | 60/276 |
| 3,977,375 | 8/1976 | Laprade et al. | 60/276 |
| 3,986,352 | 10/1976 | Casey | 60/276 |

Primary Examiner—Carlton R. Croyle
Assistant Examiner—Thomas I. Ross
Attorney, Agent, or Firm—Stevens, Davis, Miller & Mosher

[57] ABSTRACT

An exhaust gas purifying device for an internal combustion engine, comprising a catalytic converter containing a three way catalyzer therein, a first oxygen sensor disposed in the exhaust passage, and an air-fuel ratio regulating means for regulating an air-fuel ratio of the mixture fed into the cylinder of the engine so as to conform it to the stoichiometric air-fuel ratio in response to an output signal of said first oxygen sensor over a larger range of running conditions of a vehicle. Said exhaust gas purifying device further comprises a second oxygen sensor located downstream of the catalytic converter, and a secondary air feeding device located upstream of the catalytic converter for regulating the feeding of a secondary air into the exhaust gas in response to an output signal of said second oxygen sensor so that the ratio of the air consisting of said secondary air and air contained in the mixture introduced into the cylinders of the engine to the fuel contained in the mixture introduced into the cylinders is made equal to the stoichiometric air-fuel ratio at the time of acceleration, deceleration and gear-shifting.

19 Claims, 5 Drawing Figures

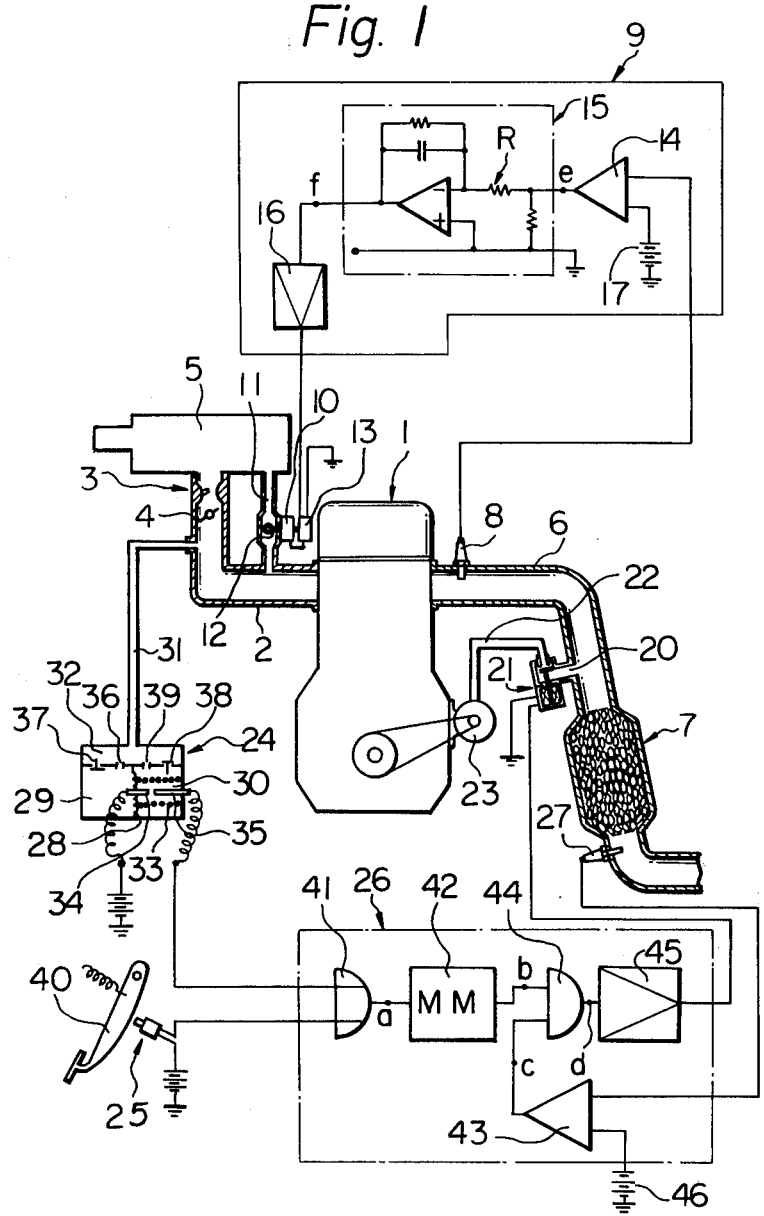

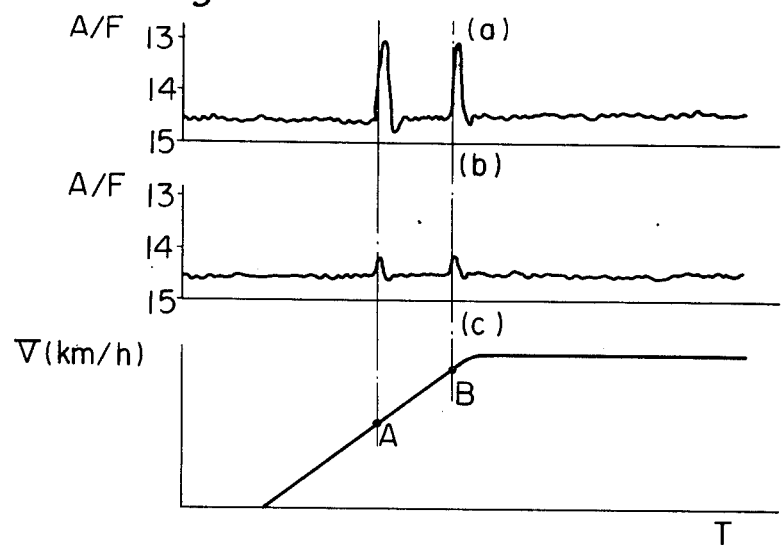
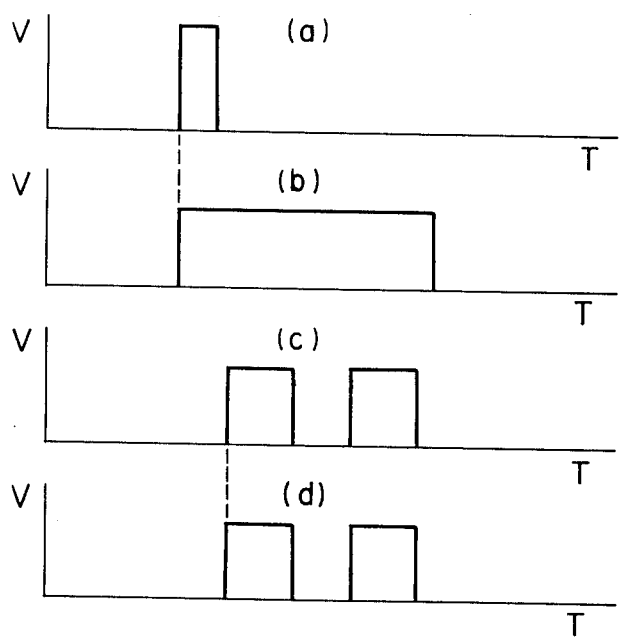

FIRST AND SECOND AIR FEEDING MEANS TO REGULATE A/F RATIO WHEREIN SECOND AIR FEED REQUIRES TWO SIGNALS FOR ACTUATION

DESCRIPTION OF THE INVENTION

The present invention relates to an exhaust gas purifying device in an internal combustion engine.

A three-way catalyzer is known which is capable of simultaneously reducing the amount of harmful CO (carbon monoxide), HC (hydrocarbons) and $NO_x$ (Nitrogen oxides) components in the exhaust gas. In order to effectively reduce the amount of harmful components in the exhaust gas by using the three way catalyzer, the ratio of the air consisting of air fed into the intake passage of the engine and air feed into the exhaust passage located upstream of the catalytic converter to the fuel fed into the intake passage and fuel fed into the exhaust passage located upstream of the catalytic converter, must be regulated so as to be made equal to the stoichiometric air-fuel ratio as closely as possible.

In order to regulate the above-mentioned ratio of air to fuel, it is necessary to first detect whether the above-mentioned ratio of air to fuel is equal to the stoichiometric air-fuel ratio. A known method for detecting this condition detects the concentration of oxygen in the exhaust gas by using an oxygen sensor. That is to say, if a passage between the inlet of the intake passage and the oxygen sensor located in the exhaust passage is defined as a fluid passage in which only air or an air-fuel mixture or an exhaust gas flows, by detecting the concentration of oxygen in the exhaust gas by means of the oxygen sensor, it is possible to detect whether the ratio of air fed into said fluid passage to fuel fed into said fluid passage (hereinafter referred to as a total air-fuel ratio) is equal to the stoichiometric air-fuel ratio. In connection with said total air and fuel ratio, it should be noted that a part of the air and fuel involved does not contribute to the combustion in the cylinder of the engine, that is to say, said air and fuel contains some air and fuel which are fed into the exhaust gas.

One known method for regulating the total air-fuel ratio, is to arrange one or more oxygen sensors in the exhaust passage of the engine. This enables regulation of the total air-fuel ratio so that it conforms to the stoichiometric air-fuel ratio by regulating the amount of air or fuel, or the amount of both air and fuel, fed into the intake passage of the engine in response to an output signal issued from the oxygen sensor. That is to say, in this conventional method, the total air-fuel ratio is regulated so that it conforms to the stoichiometric air-fuel ratio as closely as possible by regulating the air-fuel ratio of the mixture introduced into the cylinder of the engine. While it is true that this method does allow the regulation of the total air-fuel ratio over a large range of running conditions of a vehicle, the total air-fuel ratio cannot be sufficiently regulated under some running conditions. For example, regulation of the total air-fuel ratio cannot be accomplished at the time of abrupt acceleration and abrupt deceleration, at the time of manual gear-shifting and at the time of automatic gear-shifting in a vehicle equipped with an automatic transmission. That is, due to the delay in response occurring in the oxygen sensor and in the air-fuel ratio regulating device, and also due to the long distance between the oxygen sensor and the air-fuel ratio regulating device, when the amount of air introduced from the inlet of the intake passage into the intake passage is abruptly changed as in one of the above-mentioned running conditions, the operation of the air-fuel ratio regulating device cannot follow such a change. Consequently, the air-fuel ratio of the mixture introduced into the cylinder of the engine cannot be sufficiently regulated. In addition to this, under such a running condition, liquid fuel which has adhered to the inner wall of the intake manifold is instantaneously vaporized. As a result, the air-fuel ratio of the mixture introduced into the cylinder of the engine becomes much smaller than the stoichiometric air-fuel ratio and, thus, the total air-fuel ratio also becomes much smaller than the stoichiometric air-fuel ratio. Consequently, the purifying efficiency of the three way catalyzer is extremely reduced, which results in the disadvantage that the purifying operation cannot be sufficiently effected.

An object of the present invention is to eliminate the above-mentioned disadvantage.

According to the present invention, there is provided an exhaust gas purifying device in an internal combustion engine having at least one cylinder, comprising, an intake and an exhaust passage of said engine, means for producing a rich air-fuel mixture in said intake passage, a catalytic converter containing a three way catalyzer therein and disposed in said exhaust passage, first detecting means for detecting the concentration of oxygen contained in the exhaust gas flowing in the exhaust passage located upstream of said catalytic converter, said first detecting means issuing an output signal indicative of the concentration of oxygen, means for regulating the air-fuel ratio of said rich air-fuel mixture so that said air-fuel ratio conforms to the stoichiometric air-fuel ratio in response to the output signal of said first detecting means, second detecting means for detecting the concentration of oxygen contained in the exhaust gas flowing in the exhaust passage located downstream of said catalytic converter, said second detecting means issuing an output signal indicative of the concentration of oxygen, third detecting means for detecting the accelerating, decelerating, and gear-shifting operations of the engine and for issuing an output signal indicative of said operations, and means for feeding secondary air into the exhaust gas flowing in the exhaust passage located upstream of said catalytic converter so that the ratio of air consisting of said secondary air and air contained in the mixture introduced into the cylinder of the engine to the fuel contained in the mixture introduced into the cylinder of the engine is made equal to the stoichiometric air-fuel ratio in response to said output signals of said second and third detecting means at the time of acceleration, deceleration and gear-shifting.

The above-mentioned object of the present invention may be more fully understood from the following description of a preferred embodiment of the invention, together with the accompanying drawings.

BRIEF DESCRIPTION OF THE DRAWINGS

FIG. 1 is a schematic view of an exhaust gas purifying device according to the present invention;

FIG. 2(*a*) is a graph showing changes in the total air-fuel ratio in a conventional engine;

FIG. 2(*b*) is a graph showing changes in the total air-fuel ratio in an engine provided with an exhaust gas purifying device according to the present invention;

FIG. 2(*c*) is a graph showing a running condition of a vehicle;

FIG. 3 is a graph showing changes in voltage at the points a through d in FIG. 1;

DESCRIPTION OF A PREFERRED EMBODIMENT

Figure 4:
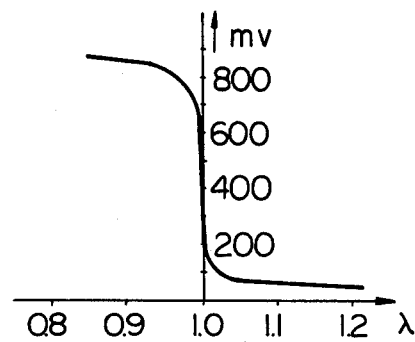
FIG. 4 is a graph showing the output characteristics of an oxygen sensor.

Referring to FIG. 1, 1 designates an engine body, 2 an intake manifold, 3 a carburetor, 4 a throttle valve, 5 an air cleaner, 6 an exhaust pipe and 7 a catalytic converter filled with a three way catalyzer. An oxygen sensor 8 is disposed in the exhaust pipe 6 in the vicinity of the engine body 1. The oxygen sensor 8 is made from, for example, a zirconia ceramic. As shown in FIG. 4, in which the ordinate indicates the output voltage (mV) of the oxygen sensor 8 and the abscissa indicates the air-fuel equivalence ratio $\lambda$ ( $\lambda$ is defined as : $\lambda$ = actual air-fuel ratio/stoichiometric air-fuel ratio), a sharp change in the output voltage of the oxygen sensor 8 occurs near the stoichiometric point. The output terminal of the oxygen sensor 8 is connected to the input side of an electronic control ciruit 9.

The intake manifold 2 is connected to the air cleaner 5 via a bypass passage 11 in which an air flow control throttle valve 12 actuated by a servomotor 10 is disposed. The drive shaft of the servomotor 10 is connected to a potentiometer 13 which is, in turn, connected to the output side of the electronic control circuit 9. The electronic control circuit 9 comprises a comparator 14, an integrating circuit 15 connected to the output side of the comparator 14 and an amplifier 16 connected to the output side of the integrating circuit 15. The output side of the amplifier 16 is connected to the potentiometer 13. The input side of the comparator 14 is connected to the oxygen sensor 8 and a reference voltage source 17. The reference voltage in the reference voltage source 17 is set to, for example, 450 mV.

Figure 5:
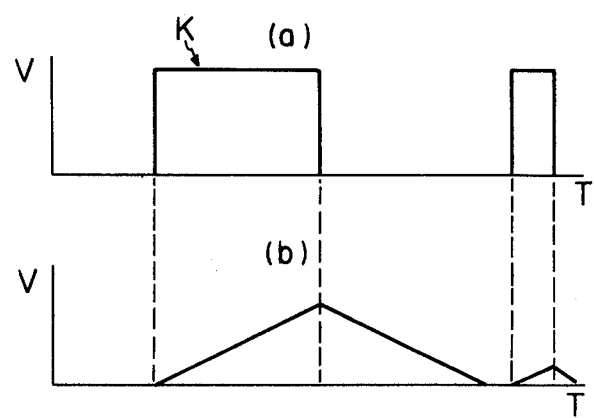
FIG. 5 is a graph showing changes in voltage at the points e and f in FIG. 1.

In FIG. 5, in which the ordinate indicates a voltage (V) and the abscissa indicates time (T), (a) shows the change in voltage at the point (e) and (b) shows change in voltage at the point (f) in the electronic control circuit 9 in FIG. 1.

When the total air-fuel ratio at the point at which the oxygen sensor 8 is located becomes smaller than the stoichiometric air-fuel ratio, the output voltage of the oxygen sensor 8 is elevated to a level beyond 700 mV as indicated in FIG. 4. Thus, since the output voltage of the oxygen sensor 8 becomes larger than the reference voltage 450 mV, an output signal K is issued from the output side of the comparator 14 as shown in FIG. 5(a). This output signal K continues to be issued during the time the total air-fuel ratio is smaller than the stoichiometric air-fuel ratio. The output signal K is transmitted to the integrating circuit 15 and is integrated therein, and thus a voltage shown in FIG. 5(b) is generated on the output side of the integrating circuit 15. This voltage is amplified in the amplifier 16 and, then, is fed to the potentiometer 13. Consequently, the servomotor 10 rotates the number of degrees corresponding to valve of said voltage and, as a result, the throttle valve 12 is opened and air is fed into the intake manifold 2 via the bypass passage 11. Then, due to the feeding of the air, when the total air-fuel ratio becomes larger than the stoichiometric air-fuel ratio, the output voltage of the oxygen sensor 8 is lowered to a level below 200 mV, whereby the comparator 14 stops issuing the output signal. After this, the output voltage of the integrating circuit 15 is gradually lowered as shown in shown in FIG. 5(b) and, correspondingly, the throttle valve 12 is gradually closed.

Referring again to FIG. 1, the carburetor 3 is set so that a rich air-fuel mixture, for example a mixture having an air-fuel ratio of 13 through 15:1, can be always obtained. Consequently, in the engine shown in FIG. 1, as aforementioned, air is fed via the bypass passage 11 into the air-fuel mixture formed in the carburetor 3 by operating the servomotor 10. As a result, the total air-fuel ratio, that is to say, in this case, the air-fuel ratio of the mixture fed into the cylinders of the engine, is regulated so that it conforms to the stoichiometric air-fuel ratio as closely as possible. By the adoption of this regulating method, the total air-fuel ratio can be regulated over a large range of running conditions of a vehicle so as to conform to the stoichiometric air-fuel ratio as closely as possible. However, when the acceleration pedal is abruptly depressed or abruptly released, as at the time of acceleration and deceleration, and also at the time of gear shifting, the air-fuel mixture introduced into the cylinder becomes instantaneously richer due to the delay in response occurring in the air-fuel ratio regulating device and also due to the vaporization of liquid fuel adhered to the inner wall of the intake manifold 2. That is to say, in the above-mentioned regulating device, the total air-fuel ratio cannot be regulated at the time of acceleration and deceleration and also at the time of gear shifting. This is shown in FIG. 2.

In FIGS. 2(a) and 2(b), the ordinates indicate the total air-fuel ratio A/F and the abscissas indicate time (T). In FIG. 3, the ordinates indicate the vehicle speed (V) and the abscissas indicate time (T). If a vehicle is slowly accelerated and gear shifting operations are carried out at the points A and B indicated in FIG 2, the total air-fuel ratio, that is to say, in this case, the air-fuel ratio of the mixture introduced into the cylinders of the engine become extremely smaller than the stoichiometric air-fuel ratio. A similar phenomenon also occurs at the time of abrupt acceleration and of abrupt deceleration. Consequently, in order to regulate the total air-fuel ratio over the entire range of running conditions of a vehicle, it is necessary to prevent occurence of this undesirable phenomenon. To this end, an internal combustion engine according to the present invention is provided with a secondary air feed port 20 in the vicinity and upstream of the catalytic converter 7. The secondary air feed port 20 is connected to an air pump 23 driven by the engine via an electromagnetic valve 21 and a conduit 22. In addition, an internal combustion engine according to the present invention comprises an acceleration-deceleration detecting switch 24 for detecting the acceleration and deceleration of a vehicle, a gear-shifting detecting switch 25 for detecting the gear-shifting operation in the transmission of a vehicle, a valve control circuit 26 for controlling the opening operation of the electromagnetic valve 21 and an oxygen sensor 27 disposed in the vicinity and downstream of the catalytic converter 27. The acceleration-deceleration detecting switch 24 comprises a first vacuum chamber 29 and a second vacuum chamber 30 which are separated by a diaphragm 28, a vacuum producing chamber 32 connected to the intake manifold 2 at a position downstream of the throttle valve 4 via a vacuum conduit 31, a compression spring 33 disposed in the second vacuum chamber 30 for biasing the diaphragm 28, a movable contact 34 fixed on the diaphragm 28, and a stationary contact 35 arranged so as to face the movable contact 34. The first vacuum chamber 29 is connected to the vacuum producing chamber 32 via a restricted opening 36 and a first check valve 37 which allows the outflow of air from the vacuum producing chamber 32 to the first vacuum chamber 29. The second vacuum chamber 30 is connected to the vacuum producing chamber 32 via a restricted opening 39 and a second check valve 38 which allows the outflow of air from the second vacuum chamber 30 to the vacuum producing chamber 32.

Assuming that the throttle valve 4 is opened to a slight extent and, thus, the vehicle is running at a low speed, the vacuum level in the intake manifold 2 is great, and the vacuum levels in the vacuum producing chamber 32 and in the first and the second vacuum chambers 29 and 30 are the same as those in the intake manifold 2. At this time, the diaphragm 28 is located at the position shown in FIG. 1. Then, in order to accelerate the vehicle, when the throttle valve 4 is opened to greater extent, the vacuum level in the intake manifold 2 abruptly decreases and, correspondingly, the vacuum level in the vacuum producing chamber 32 abruptly decreases. At this time, the first check valve 37 is opened and, thus, the vacuum level in the first vacuum chamber 29 instantaneously decreases, On the other hand, since the second check valve 38 continues to be closed, the air in the vacuum producing chamber 32 gradually flows into the second vacuum chamber 30 via the restricted opening 39, whereby the vacuum level in the second vacuum chamber 30 gradually decreases. Consequently, at the time the throttle valve 4 is abruptly opened, the pressure in the first vacuum chamber 29 becomes greater than that in the second vacuum chamber 30. As a result, the diaphragm 28 moves towards the right in FIG. 1 against the spring force of the compression spring 33, causing the contact 34 to contact the contact 35. After a while, since the vacuum level in the second vacuum chamber 30 is gradually decreased, the contacts 34 and 35 open. It will be understood from the above description that the acceleration-deceleration detecting switch 24 turns to the ON condition at the time of acceleration.

Secondly, assuming that the throttle vave 4 is opened wide and thus the vehicle is running at a high speed, the vacuum level in the intake manifold 2 is small, and the vacuum levels in the vacuum producing chamber 32, and in the first and the second vacuum chambers 29 and 30 are the same as those in the intake manifold 2. At this time, the diaphragm 28 is located at the position shown in FIG. 1. Then, in order to decelerate the vehicle, when the throttle valve 4 is closed, the vacuum level in the intake manifold 2 abruptly increases, and correspondingly the vacuum level in the vacuum producing chamber 32 abruptly increases. At this time, the second check valve 38 is opened and, thus, the vacuum level in the second vacuum chamber 30 instantaneously increases. On the other hand, since the first check valve 37 continues to be closed, the air in the first vacuum chamber 29 gradually flows into the vacuum producing chamber 32 via the restricted opening 36, whereby the vacuum level in the first vacuum chamber 29 gradually increases. Consequently, at the time the throttle valve 4 is abruptly closed, the pressure in the first vacuum chamber 29 becomes greater than that in the second vacuum chamber 30. As a result, the diaphragm 28 moves towards the right in FIG. 1 against the spring force of the compression spring 33, causing the contact 34 to contact the contact 35. After a while, since the vacuum level in the first vacuum chamber 29 gradually increases, the contacts 34 and 35 open. It will be understood from the above description that the acceleration-deceleration detecting switch 24 also turns to the ON condition at the time of deceleration.

The gear-shifting detecting switch 25 is arranged so as to be associated with the depressing of the clutch pedal 40 of the vehicle in such a way that the gear-shifting detecting switch 25 turns to the ON condition when the clutch pedal 40 is depressed in order to shift a gear in the transmission of the vehicle.

The valve control circuit 26 comprises an OR-circuit 41 connected to the acceleration-deceleration detecting switch 24 and the gear-shifting detecting switch 25, a monostable multi-vibrator 42 connected to the output side of the OR-circuit 41, a comparator 43, and AND-circuit 44 connected to the output sides of the monostable multi-vibrator 42 and the comprator 43, and an amplifier 45 connected to the output side of the AND-circuit 44. The input side of the comparator 43 is connected to the oxygen sensor 27 and a reference voltage source 46. If a sensor made of a zirconia ceramic and having an output characteristic as shown in FIG. 4 is used as the oxygen sensor 27, a reference voltage in the reference voltage source 46 is set to, for example, 450 mV.

FIG. 3, in which the ordinate indicates voltage (V) and the abscissa indicates time (T), shows the changes in voltage $(a)$, $(b)$, $(c)$ and $(d)$ at the points a, b, c and d, respectively, in the valve control circuit 26 in FIG. 1.

If the clutch pedal 40 is depressed in order to shift a gear in the transmission of a vehicle, the gear-shifting detecting switch 25 turns to the ON condition and, thus, a pulse as shown in FIG. 3($a$) is generated at the point a. As shown in FIG. 3($b$), the monostable multi-vibrator 42 turns to the ON condition by using the building-up of said pulse as a trigger signal. The duration of the ON condition of the monostable multi-vibrator 42 can be set at will by changing a time constant of the monostable multi-vibrator 42. As aforementioned, when the clutch pedal 40 is depressed, the air-fuel mixture introduced into the cyclinder of the engine becomes richer and, thus, the total air-fuel ratio becomes smaller than the stoichiometric air-fuel ratio. That is, the amount of unburned components in the exhaust gas becomes much larger than the amount of oxygen remaining in the exhaust gas. When this exhaust gas containing an excessive amount of unburned components therein flows in the exhaust pipe 6, a part of this exhaust gas diffuses into the preeceding exhaust gas flowing in the exhaust pipe 6 and containing therein a substantially stoichiometric amount of oxygen necessary to cause the oxidation of the unburned components. Said part of the exhaust gas reaches the oxygen sensor 27 before the remaining large part of the exhaust gas containing an excessive amount of unburned components reaches the oxygen sensor 27. When said part of the exhaust gas reaches the oxygen sensor 27, its arrival is instantaneously detected by the oxygen sensor 27 and, as a result, a pulse signal shown in FIG. 3($c$) is generated on the output side of the comparator 43. At this time, since the monostable multi-vibrator 42 is in the ON condition, a pulse signal as shown in FIG. 3($d$) is generated on the output side of the AND circuit 44. This pulse signal is amplified in the amplifier 45 and, then, fed to the solenoid of the electromagnetic valve 21. As a result of this, the electromagnetic valve 21 opens, whereby secondary air is fed into the exhaust pipe 6 from the air pump 23. When the amount of unburned components in the exhaust gas becomes smaller than that of the oxygen contained in the exhaust gas, that is to say, when the total air-fuel ratio measured at the point wherein the oxygen sensor 27 is located becomes larger than the stoichiometric air-fuel ratio due to the feeding of the secondary air, the output voltage of the oxygen sensor 27 becomes smaller than the reference voltage 450 mV. As a result, the voltage at the point c becomes zero. Consequently, at this time, the output side of the AND circuit 44 is in the OFF condition, whereby the electromagnetic valve 21 is closed.

The opening and closing operations of the electromagnetic valve 21 contine to be carried out during the time the monostable multi-vibrator 42 is in the ON condition. Consequently, even if the clutch pedal 40 is depressed in order to shift gears in the transmission of the vehicle, the total air-fuel ratio measured at the inlet side of the catalytic converter 7 can be regulated so that it substantially conforms to the stoichiometric air-fuel ratio due to the feeding of the secondary air.

The above regulation of the total air-fuel ratio can be also carried out at the time of accelration and deceleration. As is shown in FIG. 2(a), after the accelerator pedal is abruptly depressed and abruptly released, and also after the clutch pedal 40 is depressed, the air-fuel ratio of the mixture introduced into the cylinder of the engine becomes richer for a while. The length of time during which said air-fuel ratio is richer has been known from experience. Consequently, it is sufficient to feed secondary air into the exhaust gas during said length of time, and it is unnecessary to feed secondary air into the exhaust gas except for said length of time. Therefore, the monostable multi-vibrator 42 is provided for setting the duration of feed of the secondary air into the exhaust gas.

In the above-mentioned embodiment, when the total air-fuel ratio becomes smaller than the stoichiometric air-fuel ratio, a change in the total air-fuel ratio is detected by the oxygen sensor 27, whereby the electromagnetic valve 21 is instantaneously opened to the full extent. Consequently, there is a danger that an excessive amount of the secondary air will be fed into the exhaust gas. In order to avoid this, it is possible to provide an integrating circuit such as the integrating circuit 15 between the AND circuit 44 and the amplifier 45. In this case, the integrating circuit is required to have a steeper pulse build-up characteristic than the build-up characteristic shown in FIG. 5(b). This is easily carried out by merely changing the value of a resistance R in the integrating circuit 15. Of course, it is necessary to use the combination of a servomotor and a potentiometer, such as the servomotor 10 and the potentiometer 13, or to use a pulse motor instead of the electromagnetic valve 21.

In the embodiment shown in FIG. 1, the time required for the exhaust gas passing through the secondary air feed port 20 to reach the oxygen sensor 27 is much shorter than the tiame required for the exhaust gas passing through the intake manifold 2 to reach the oxygen sensor 8. Consequently, even if the air-fuel ratio of the mixture introduced into the cylinder of the engine temporally becomes smaller than the stoichiometric air-fuel ratio as shown in FIG. 2(a), secondary air is fed into the exhaust gas, whereby the total air-fuel ratio measured at the inlet of the catalytic converter 7 can be regulated so as to substantially conform to the stoichiometric air-fuel ratio as shown in FIG. 2(b). As a result, according to the present invention, it is possible to effectively reduce the amount of harmful HC, CO and $NO_x$ components in the exhaust gas.

In the embodiment shown in FIG. 1, the carburetor 3 is used as a fuel feeding device. However, a fuel injection system or a L.P.G. (liquid petroleum gas) feed device can be used as the fuel feeding device instead of the carburetor 3. In addition, when a lean air-fuel mixture is used as a mixture to be fed into the engine cylinders, an exhaust gas purifying device can be constructed such that secondary fuel is fed into the exhaust gas instead of secondary air.

While the invention has been described by reference to a specific embodiment chosen for purposes of illustration, it should be apparent that numerous changes could be made within the sprit and scope of the invention concepts disclosed and, accordingly, it is intended that the invention be limited only by the language of the following claims.

What is claimed is:

1. An exhaust gas purifying device in an internal combustion engine having at least one cylinder, comprising:

an intake and an exhaust passage of said engine;

means for producing a rich air-fuel mixture in said intake passage;

a catalytic converter containing a three way catalyzer therein and disposed in said exhaust passage;

first detecting means for detecting the concentration of oxygen containing in the exhaust gas flowing in the exhaust passage located upstream of said catalytic converter, said first detecting means issuing a first output signal indicative of the concentration of oxygen;

means for regulating the air-fuel ratio of said rich air-fuel mixture so that said air-fuel ratio conforms to the stoichiometric air-fuel ratio in response to said first output signal of said first detecting means;

second detecting means for detecting the concentration of oxygen contained in the exhaust gas flowing in the exhaust passage located downstream of said catalytic converter, said second detecting means issuing a second output signal indicative of the concentration of oxygen;

third detecting means for detecting the accelerating, decelerating, and gear-shifting operations of the engine and for issuing a third output signal indicative of said operations, and means for feeding secondary air into the exhaust gas flowing in the exhaust passage located upstream of said catalytic converter so that the ratio of air consisting of said secondary air and air contained in the mixture introduced into the cylinder of the engine to the fuel contained in the mixture introduced into the cylinder of the engine is made equal to the stoichiometric air-fuel ratio in response to both said second and third output signals of said second and third detecting means at the time of acceleration, deceleration and gear-shifting.

2. An exhaust gas purifying device as recited in claim 1, wherein said first detecting means comprises an oxygen sensor issuing the first output signal which comprises two separate voltage levels consisting of a high and a low level, said high voltage level being issued when the air-fuel ratio of the mixture introduced into the cylinder of the engine is smaller than the stoichiometric air-fuel ratio, while said low voltage level is issued when the air-fuel ratio of the mixture introduced into the cylinder of the engine is larger than the stoichiometric air-fuel ratio.

3. An exhaust gas purifying device as recited in claim 2, wherein said air-fuel ratio regulating means comprises an air feeding device for controlling the amount of air to be fed into said intake passage, and an electronic control circuit connected to said oxygen sensor and issuing a control signal used for controlling said air feeding device in response to said first output signal of said oxygen sensor.

4. An exhaust gas purifying device as recited in claim 3, wherein said air feeding device comprises a throttle valve for controlling the flow rate of air, a servomotor for actuating said throttle valve, and a potentiometer connected to said servomotor for controlling the operation of said servomotor in response to the control signal issued from said electronic control circuit.

5. An exhaust gas purifying device as recited in claim 3, wherein said electronic control circuit comprises a comparator connected to said oxygen sensor for issuing an output signal only when the high voltage level is applied to said comparator from said oxygen sensor, an integrating circuit connected to said comparator for integrating the output signal issued from said comparator and an amplifier connected to said integrating circuit for amplifying the output signal issued from said integrating circuit and for issuing the control pulse used for controlling said air feeding device.

6. An exhaust gas purifying device as recited in claim 1, wherein said second detecting means comprises an auxiliary oxygen sensor issuing the second output signal which comprises two separate voltage levels consisting of a high and a low level, said high voltage level being issued when the ratio of air consisting of secondary air fed from said secondary air feeding means and air contained in the mixture introduced into the cylinder of the engine of fuel contained in the mixture introduced into the cylinder of the engine is smaller than the stoichiometric air-fuel ratio, while said low voltage level is issued when the ratio of said air to said fuel is larger than the stoichiometric air-fuel ratio.

7. An exhaust gas purifying device as recited in claim 6, wherein said secondary air feeding means comprises a secondary air feeding device for controlling the feeding of secondary air into the exhaust passage, and an auxiliary electronic control circuit connected to said auxiliary oxygen sensor and issuing a control signal used for controlling said secondary air feeding device in response to the second and third output signals of said auxiliary oxygen sensor and of said third detecting means.

8. An exhaust gas purifying device so recited in calim 7, wherein said secondary air feeding device comprises an electromagnetic valve connected to a secondary air source for feeding secondary air into the exhaust passage in response to the control signal issued from said auxiliary electronic control circuit.

9. An exhaust gas purifying device as recited in claim 8, wherein said secondary air source comprises an air pump driven by the engine.

10. An exhaust gas purifying device as recited in claim 7, in which said third detecting means comprises first means for detecting accelerating and decelerating operations of the engine, and second means for detecting the gear-shifting operation of the engine, wherein said auxiliary electronic control circuit comprises a comparator connected to said auxiliary oxygen sensor for issuing an output signal only when the high voltage level is applied to said comparator from said auxiliary oxygen sensor, an OR circuit having two inputs one of which is connected to said first means, the other input being connected to said second means, a monostable multi-vibrator connected to said OR circuit and being turned to the ON condition in response to the output signals of said first and second means at the time of acceleration and deceleration and gear-shifting, an AND circuit having two inputs one of which is connected to said monostable multi-vibrator, the other input being connected to said comparator, and an amplifier connected to said AND circuit for amplifying an output signal issued from said AND circuit and for issuing the control pulse used for controlling said secondary air feeding device.

11. An exhaust gas purifying device as recited in claim 10, wherein said auxiliary electronic control circuit further comprises an integrating circuit between said AND circuit and said amplifier.

12. An exhaust gas purifying device as recited in claim 1, wherein said third detecting means comprises first means for detecting accelerating and decelerating operations of the engine, and second means for detecting the gear-shifting operation of the engine.

13. An exhaust gas purifying device as recited in claim 12, wherein said first means comprises a first and a second vacuum chamber separated by a diaphragm, a third vacuum chamber connected to said intake passage, said third vacuum chamber being connected to said first vacuum chamber via a restricted opening and a check valve only allowing outflow of air from said third vacuum chamber to said first vacuum chamber on one hand and connected to said second vacuum chamber via a restricted opening and a check valve only allowing outflow of an air from said second vacuum chamber to said third vacuum chamber on the other hand, a stationary contact in said second vacuum chamber, and a movable contact fixed on said diaphragm and arranged so as to face said stationary contact, said movable contact coming into contact with said stationary contact due to a difference in vacuum levels in said first and second vacuum chambers caused by an abrupt change in vacuum level in said third vacuum chamber at the time of acceleration and deceleration.

14. An exhaust gas purifying device as recited in claim 12, in which the engine is provided with a clutch pedal, wherein said second means comprises a change-over switch actuated by the depression of said clutch pedal.

15. An exhaust gas purifying device as recited in claim 12, in which the engine is provided with an automatic gear-shifting transmission, wherein said second means comprises a change-over switch associated with said transmission and actuated when a gear-shifting operation is automatically carried out.

16. An exhaust gas purifying device as recited in claim 1, wherein said rich air-fuel mixture producing means comprises a carburetor.

17. An exhaust gas purifying device as recited in claim 16, wherein an air-fuel ratio of the mixture produced in said rich air-fuel mixture producing means is set to the range of 13 through 14:1.

18. An exhaust gas purifying device as recited in claim 1, wherein said rich air-fuel mixture producing means comprises a liquid petroleum gas feed device.

19. An exhaust gas purifying device as recited in claim 1, wherein said rich air-fuel mixture producing means comprises an fuel injection device.

* * * * *